(12) United States Patent
Heist et al.

(10) Patent No.: US 7,465,391 B2
(45) Date of Patent: Dec. 16, 2008

(54) APPARATUS FOR SEPARATING SOLIDS FROM FLOWING LIQUIDS

(75) Inventors: James A. Heist, Cary, NC (US); Alex Davey, Belcamp, MD (US); David Ziegler, Oviedo, FL (US)

(73) Assignee: CDS Technologies, Inc., Morgan Hill, CA (US)

( * ) Notice: Subject to any disclaimer, the term of this patent is extended or adjusted under 35 U.S.C. 154(b) by 0 days.

(21) Appl. No.: 11/222,612

(22) Filed: Sep. 9, 2005

(65) Prior Publication Data

US 2007/0056889 A1    Mar. 15, 2007

(51) Int. Cl.
*B01D 29/66* (2006.01)
*B01D 35/22* (2006.01)
*B01D 36/04* (2006.01)

(52) U.S. Cl. .................. 210/162; 210/304; 210/409; 210/512.1; 210/788; 210/791

(58) Field of Classification Search .................. 210/162, 210/788
See application file for complete search history.

(56) References Cited

U.S. PATENT DOCUMENTS

| | | |
|---|---|---|
| 317,366 A | 5/1885 | Jaeger |
| 419,887 A | 1/1890 | Robinson |
| 454,185 A | 6/1891 | Robinson |
| 636,747 A | 11/1899 | Blake |
| 775,664 A | 11/1904 | McVeety |
| 964,428 A | 7/1910 | Johnson et al. |
| 1,100,435 A | 6/1914 | Lance |
| 1,153,186 A | 9/1915 | Bates |
| 1,178,428 A | 4/1916 | Tozier |
| 1,213,624 A | 1/1917 | Glenn |
| 1,451,394 A | 4/1923 | Hurst |

(Continued)

FOREIGN PATENT DOCUMENTS

AU                628745            9/1992

(Continued)

OTHER PUBLICATIONS

Allison, R. A. et al., "The Pollutec Stormwater Pollution Trap: Field Trials," Water, pp. 29-33, Nov./Dec. 1996.

(Continued)

*Primary Examiner*—Robert James Popovics
(74) *Attorney, Agent, or Firm*—Thompson Hine LLP

(57) ABSTRACT

An apparatus for separating solid matter from a liquid stream, where the apparatus includes a generally cylindrical separation panel surrounding an interior space, which is oriented so as to have a substantially vertical longitudinal axis. The separation panel has a plurality of vertically and horizontally spaced openings which are adapted to remove solid material larger than a predetermined size from liquid passing through the separation panel. The apparatus also includes a chamber surrounding the separation panel and providing a chamber portion into which the liquid passes after passing through the separation panel. The apparatus may further include an inlet positioned below the separation panel, through which the liquid stream is delivered from a bottom opening of the separation panel to the interior space and which is arranged such that the liquid circulates about the axis so as to pass the separation panel, and an outlet extending from the chamber portion.

2 Claims, 11 Drawing Sheets

U.S. PATENT DOCUMENTS

| | | | |
|---|---|---|---|
| 1,699,828 A | 1/1929 | Wyckoff | |
| 1,856,685 A * | 5/1932 | Anderson | 55/413 |
| 1,861,031 A | 5/1932 | Schmitt | |
| 1,897,195 A | 2/1933 | Howden | |
| 2,039,692 A | 5/1936 | Van Tongeren | |
| 2,071,975 A | 2/1937 | Holm-Hansen et al. | |
| 2,087,789 A | 7/1937 | Allardice | |
| 2,152,115 A | 3/1939 | Van Tongeren | |
| 2,191,190 A * | 2/1940 | De Guire | 55/461 |
| 2,223,104 A | 11/1940 | Hansen | |
| 2,226,968 A * | 12/1940 | Carlo | 210/532.1 |
| 2,346,005 A * | 4/1944 | Bryson | 210/788 |
| 2,357,734 A | 9/1944 | Haber | |
| 2,425,932 A * | 8/1947 | Grreen et al. | |
| 2,568,032 A | 9/1951 | Stephanoff | |
| 2,571,331 A | 10/1951 | Blomen | |
| 2,578,568 A * | 12/1951 | Mayer et al. | 96/210 |
| 2,788,087 A | 4/1957 | Lenehan | |
| 2,827,169 A | 3/1958 | Cusi | |
| 2,913,114 A | 11/1959 | Plaven | |
| 2,936,074 A | 5/1960 | Forshee | |
| 2,998,137 A | 8/1961 | Vane | |
| 3,088,595 A * | 5/1963 | Robb | 210/304 |
| 3,151,961 A * | 10/1964 | Blackmore et al. | 96/210 |
| 3,304,697 A * | 2/1967 | Ramsey | 55/459.1 |
| 3,374,894 A * | 3/1968 | Webster | 210/257.1 |
| 3,391,787 A * | 7/1968 | Salomon | 210/788 |
| 3,487,931 A | 1/1970 | Paulson | |
| 3,489,680 A * | 1/1970 | Snavely, Jr. | 516/136 |
| 3,504,804 A * | 4/1970 | Arnold et al. | 210/512.1 |
| 3,523,077 A | 8/1970 | Camirand et al. | |
| 3,630,379 A * | 12/1971 | Sharples | 210/369 |
| 3,771,288 A * | 11/1973 | Wisman et al. | 96/210 |
| 3,771,290 A * | 11/1973 | Stethem | 96/210 |
| 3,792,573 A | 2/1974 | Borsheim | |
| 3,895,522 A | 7/1975 | Skvarenina | |
| 3,951,630 A * | 4/1976 | Kleissler, Jr. | 55/378 |
| 3,965,013 A * | 6/1976 | Jackson | 210/519 |
| 3,985,522 A | 10/1976 | Kuhlmann | |
| 4,001,121 A * | 1/1977 | Bielefeldt | 210/512.3 |
| 4,003,836 A | 1/1977 | Stearns et al. | |
| 4,081,374 A | 3/1978 | Forshee | |
| 4,102,790 A | 7/1978 | Portyrata | |
| 4,108,778 A | 8/1978 | Lambert et al. | |
| 4,198,220 A | 4/1980 | Keller | |
| 4,214,982 A * | 7/1980 | Pfalzer | 209/164 |
| 4,221,667 A | 9/1980 | Suhrheinrich | |
| 4,279,743 A * | 7/1981 | Miller | 209/731 |
| 4,349,436 A | 9/1982 | Kaump | |
| 4,397,741 A * | 8/1983 | Miller | 209/170 |
| 4,399,027 A * | 8/1983 | Miller | 209/164 |
| 4,415,462 A | 11/1983 | Finch et al. | |
| 4,418,504 A | 12/1983 | Lassiter | |
| 4,441,999 A | 4/1984 | Frykhult | |
| 4,467,570 A | 8/1984 | Kriegel | |
| 4,476,021 A | 10/1984 | Souza | |
| 4,551,241 A * | 11/1985 | Saverse et al. | 209/135 |
| 4,551,247 A | 11/1985 | Borchert et al. | |
| 4,584,003 A | 4/1986 | Oda et al. | |
| 4,634,537 A | 1/1987 | Schreiber | |
| 4,650,570 A | 3/1987 | Fjällström | |
| 4,678,589 A | 7/1987 | Ayres, Jr. | |
| 4,692,101 A * | 9/1987 | Fink et al. | 417/68 |
| 4,713,096 A * | 12/1987 | Kajihara | 55/459.1 |
| 4,744,890 A * | 5/1988 | Miller et al. | 209/164 |
| 4,838,434 A * | 6/1989 | Miller et al. | 209/164 |
| 4,853,116 A | 8/1989 | Wallander | |
| 4,855,038 A | 8/1989 | LeBlanc | |
| 4,860,591 A * | 8/1989 | Garland | 73/861.04 |
| 4,878,924 A * | 11/1989 | Yano et al. | 96/212 |
| 4,883,509 A | 11/1989 | Giusti et al. | |
| 4,956,101 A | 9/1990 | Holmberg | |
| 4,997,549 A * | 3/1991 | Atwood | 209/164 |
| 5,000,842 A | 3/1991 | Ljokkoi | |
| 5,034,122 A | 7/1991 | Wiesemann | |
| 5,069,751 A * | 12/1991 | Chamblee et al. | 162/5 |
| 5,116,488 A * | 5/1992 | Torregrossa | 209/170 |
| 5,126,039 A | 6/1992 | Silander | |
| 5,131,980 A * | 7/1992 | Chamblee et al. | 162/4 |
| 5,173,177 A * | 12/1992 | Greenwood et al. | 209/170 |
| 5,186,836 A * | 2/1993 | Gauthier et al. | 210/512.1 |
| 5,271,191 A | 12/1993 | Vahamaki | |
| 5,376,268 A * | 12/1994 | Ikeda | 210/383 |
| 5,382,358 A * | 1/1995 | Yeh | 210/194 |
| 5,462,669 A * | 10/1995 | Yeh | 210/703 |
| 5,510,019 A * | 4/1996 | Yabumoto et al. | 210/137 |
| 5,524,770 A | 6/1996 | LeBlanc et al. | |
| 5,529,190 A * | 6/1996 | Carlton et al. | 209/170 |
| 5,531,888 A * | 7/1996 | Geiger et al. | 210/162 |
| 5,543,038 A | 8/1996 | Johannessen | |
| 5,560,818 A * | 10/1996 | Sharrow | 209/170 |
| 5,599,365 A * | 2/1997 | Alday et al. | 55/426 |
| 5,622,545 A * | 4/1997 | Mazzei et al. | 96/210 |
| 5,624,558 A | 4/1997 | Aaltonen et al. | |
| 5,662,790 A * | 9/1997 | Carlton et al. | 209/170 |
| 5,674,386 A | 10/1997 | Filion | |
| 5,690,813 A * | 11/1997 | Coale | 210/86 |
| 5,770,057 A | 6/1998 | Filion | |
| 5,779,888 A | 7/1998 | Bennett | |
| 5,788,848 A | 8/1998 | Blanche et al. | |
| 5,814,216 A * | 9/1998 | Filion | 210/154 |
| 6,063,296 A | 5/2000 | Ackerman et al. | 210/767 |
| 6,086,756 A * | 7/2000 | Roy | 210/155 |
| 6,125,826 A * | 10/2000 | Brocard et al. | 123/510 |
| 6,151,837 A | 11/2000 | Ealer, Sr. | |
| 6,176,903 B1 * | 1/2001 | Wamsiedler | 96/208 |
| 6,241,881 B1 | 6/2001 | Pezzaniti | |
| 6,419,843 B1 * | 7/2002 | Natarius | 210/787 |
| 6,468,426 B1 * | 10/2002 | Klass | 210/304 |
| 6,475,381 B1 * | 11/2002 | Gustafsson | 210/151 |
| 6,497,816 B2 * | 12/2002 | Naddy | 210/162 |
| 6,511,595 B2 | 1/2003 | Crompton et al. | |
| 6,544,416 B2 * | 4/2003 | Helwig | 210/304 |
| 6,581,783 B2 * | 6/2003 | Blanche et al. | 210/383 |
| 6,641,720 B1 | 11/2003 | Crompton et al. | |
| 6,672,461 B2 * | 1/2004 | Miller et al. | 209/722 |
| 6,679,994 B1 * | 1/2004 | Turco et al. | 210/767 |
| 6,705,049 B2 * | 3/2004 | Esmond et al. | 52/16 |
| 6,773,603 B2 * | 8/2004 | Moorehead et al. | 210/704 |
| 6,780,310 B1 * | 8/2004 | Howe | 210/155 |
| 6,840,383 B2 * | 1/2005 | Kitano et al. | 209/170 |
| 6,868,971 B2 * | 3/2005 | Phillips | 209/17 |
| 6,913,155 B2 * | 7/2005 | Bryant | 210/521 |
| 6,919,033 B2 * | 7/2005 | Stark et al. | 210/787 |
| 6,951,619 B2 * | 10/2005 | Bryant | 210/788 |
| 6,953,529 B2 * | 10/2005 | Weir | 210/791 |
| 6,991,114 B2 * | 1/2006 | Allen et al. | 210/519 |
| 6,998,038 B2 * | 2/2006 | Howard | 210/111 |
| 7,067,065 B2 * | 6/2006 | Schloss | 210/803 |
| 7,077,957 B2 * | 7/2006 | Posselt | 210/304 |
| 7,238,281 B2 * | 7/2007 | Su et al. | 210/170.03 |
| 7,258,785 B2 * | 8/2007 | Weir et al. | 210/163 |
| 7,296,692 B2 * | 11/2007 | Allen et al. | 210/519 |
| 7,297,266 B2 * | 11/2007 | Cobb et al. | 210/305 |
| RE40,407 E * | 7/2008 | Natarius | 210/788 |
| 2001/0013489 A1 * | 8/2001 | Williamson | 210/153 |
| 2002/0011454 A1 * | 1/2002 | Helwig | 210/787 |
| 2002/0030005 A1 * | 3/2002 | Crompton et al. | 210/304 |
| 2004/0055950 A1 * | 3/2004 | Bryant | 210/521 |
| 2004/0206678 A1 * | 10/2004 | Takahashi et al. | 210/86 |
| 2005/0040113 A1 * | 2/2005 | Howard | 210/744 |
| 2005/0056587 A1 * | 3/2005 | Allen et al. | 210/519 |
| 2005/0077248 A1 * | 4/2005 | Stark et al. | 210/747 |
| 2005/0167372 A1 * | 8/2005 | Heist et al. | 210/787 |

| | | | |
|---|---|---|---|
| 2005/0184007 A1* | 8/2005 | Allard et al. | 210/512.2 |
| 2005/0263448 A1* | 12/2005 | Heist et al. | 210/304 |
| 2006/0163147 A1* | 7/2006 | Dierkes et al. | 210/446 |
| 2007/0012608 A1* | 1/2007 | Su et al. | 210/170.03 |
| 2007/0056889 A1* | 3/2007 | Heist et al. | 210/162 |
| 2007/0108122 A1* | 5/2007 | Andoh et al. | 210/512.1 |
| 2007/0267342 A1* | 11/2007 | Cobb et al. | 210/512.1 |
| 2008/0073258 A1* | 3/2008 | Su et al. | 210/170.03 |
| 2008/0121579 A1* | 5/2008 | Dierkes | 210/170.03 |
| 2008/0121594 A1* | 5/2008 | Dierkes | 210/788 |

FOREIGN PATENT DOCUMENTS

| | | |
|---|---|---|
| AU | 6103494 A1 | 8/1994 |
| DE | 1 442 417 | 11/1968 |
| DE | 27 43 580 A1 | 3/1979 |
| DE | 87 07 094 U1 | 10/1987 |
| DE | 91 14 607 U1 | 4/1992 |
| DE | 41 25 419 A1 | 8/1992 |
| DE | 42 11 752 A1 | 10/1993 |
| DE | 10231241 A1 * | 1/2004 |
| EP | 0 098 820 A2 | 1/1984 |
| FR | 550 484 | 3/1923 |
| FR | 26 871 | 3/1924 |
| FR | 2 520 632 | 8/1983 |
| FR | 2 691 487 A1 | 11/1993 |
| GB | 514 273 | 11/1939 |
| GB | 1 177 176 | 1/1970 |
| GB | 1 408 003 | 10/1975 |
| GB | 2 100 150 A | 12/1982 |
| JP | 59-18805 A | 1/1984 |
| JP | 62-171719 A | 7/1987 |
| NO | 304099 B1 | 1/1994 |
| WO | WO 86/07106 A1 | 12/1986 |
| WO | WO 91/17811 A1 | 11/1991 |
| WO | WO 93/01877 A13 | 2/1993 |
| WO | WO 94/17896 A1 | 8/1994 |
| WO | WO 2004103916 A1 * | 12/2004 |
| WO | WO 2005012183 A2 * | 2/2005 |
| WO | WO 2006125168 A2 * | 11/2006 |

OTHER PUBLICATIONS

"Cans, Bottles, Cups, Bags, Surface in Waste Clean-Up," Leader, 1 page, Aug. 15, 1996.
CDS Technologies, Inc., Brochure for "Water Pollution . . . The Environmental Time-Bomb Of The 90's," 2 pages, no date.
Gilchrist, Gavin, "Now Rubbish Won't Go With The Flow," The Sydney Morning Herald, 1 page, Nov. 8, 1995.
Grant Amendment Application for "Pilot-Scale Demonstration Of The Continuous Deflection Separation Technology For SSO," Rockland County Sewer District No. 1 (Orangeburg, NY) and HydroQual, Inc., 7 pages, Sep. 9, 1996.
"Grant To Keep Beaches Cleaner," Government Officer, p. 25, May 17, 1995.
Gregory, Paul, "Sump Cuts Debris In Runoff," NZ Herald, Section One, p. 15, Jul. 11, 1996.
H.I.L. Technology, Inc., Brochure for "Storm King," 6 pages, no date.
Lake, Tim, "Hope For A Cleaner Balmoral," Mosman Daily, p. 5, Nov. 16, 1995.
"Local Invention A World First," The Southern Peninsula Local, vol. 2, No. 16, pp. 1 and 13, Oct. 17, 1995.
Lyco Manufacturing, Inc., Brochure for "Double-Drum Screens," 2 pages, no date.
Perry's Chemical Engineers' Handbook, 6th Edition, pp. cover, copyright, 17-56 and 17-57, 1984.
Phelan, Amanda, "'Snail' Drains Set The Pace," The Northern Herald, 1 page, May 23, 1996.
Proposal for "Lake Merritt Watershed Storm Water Pollution Reduction Program," City of Oakland, CA, and County of Alameda, CA, 3 pages, 1998.
"Risk Management Research Plan For Wet Weather Flows," National Risk Management Research Laboratory, US Environmental Protection Agency, 92 pages, Nov. 1996.
"Sifting Through The Rubbish," Mainstream, vol. 5, 1 page, Spring 1996.
Strong, Geoff, "Victoria Ignores Its Own Pollution Beater," The Sunday Age, p. 4, Dec. 24, 1995.
Thomas Register of American Manufacturers, Products & Services Section, pp. 8429 and 8625-8633, 1990.
Vortechnics, Brochure for "Vortechs™ Stormwater Treatment System," 4 pages, no date.
Weir, Leanne, "New Pollution Device Offers Hope For Rivers," The Advertiser, p. 22, Jun. 7, 1995.
Winkler, Tim, "Street Habits Choke Drains, Study Finds," The Age, p. A7, Oct. 4, 1996.
Wong, Tony H. F. et al., "A Solid Separator Using A Continuous Deflective System," 7th International Conference on Urban Stormwater Drainage, Hannover, Germany, 5 pages, Sep. 9-13, 1996.
Wong, Tony H. F. et al., "An Innovative Gross Pollutant Trap For Stormwater Treatment," Proceedings of the Institution of Engineers, 2nd International Symposium on Urban Stormwater Management, Melbourne, Australia, pp. 407-412, Jul. 1995.
"5.1—Tamis Pour Eaux Résiduaires," Memento Technique De L'eau, Edition du Cinquantenaire, Neuvième Édition, Tome 2, 2 pages, 1989.

* cited by examiner

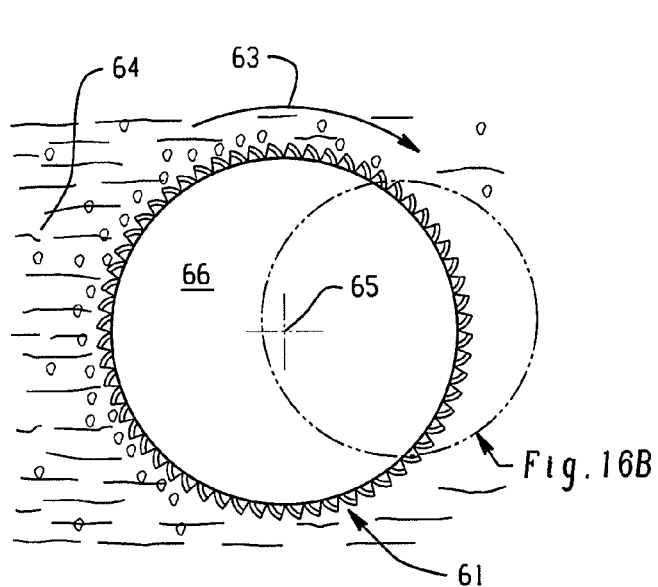
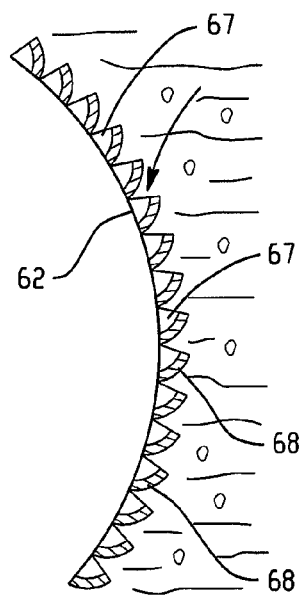
Fig. 16A
PRIOR ART
Fig. 16B
PRIOR ART
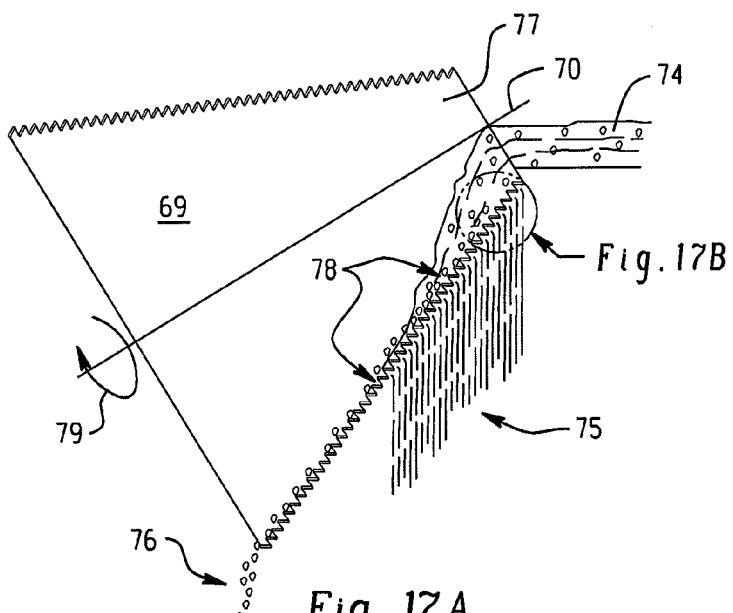
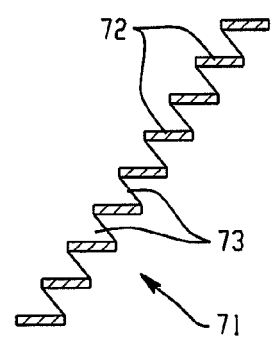
Fig. 17A
PRIOR ART
Fig. 17B
PRIOR ART

APPARATUS FOR SEPARATING SOLIDS FROM FLOWING LIQUIDS

CROSS-REFERENCES TO RELATED APPLICATIONS

This application is related to U.S. patent application Ser. No. 08/934,078, filed Sep. 19, 1997, now U.S. Pat. No. 6,641,720, issued Nov. 4, 2003, which is a continuation-in-part of U.S. patent application Ser. No. 08/501,011, filed on Dec. 6, 1995, now abandoned, and U.S. patent application Ser. No. 08/750,706, filed on Mar. 24, 1997, now U.S. Pat. No. 5,788,848, issued Aug. 4, 1998, each of which is incorporated herein by reference. application Ser. No. 08/501,011 is a 371 under 35 U.S.C. § 365 of International Applications Nos. PCT/AU94/00061, filed Feb. 11, 1994 and application Ser. No. 08/750,706 is a 371 of PCT/AU95/00351, filed Jun. 16, 1995.

BACKGROUND OF THE INVENTION

This invention relates to methods of and apparatus for separating floating and suspended solids from a flowing liquid using continuous deflective separation, and particularly, but not solely to non-mechanical methods and apparatus.

More generally, the invention relates to apparatus and methods for separating solids or particulate matter from flowing liquids or gases. The invention has particular, although not exclusive, application to the filtration of floating and entrained solids from discharges of water. One particular application of the invention is in relation to storm water drain technology.

There are many applications where it is desirable to separate solids from a flowing liquid including:

1. Separation of solids from stormwater.

In many areas of the world, stormwater is directed to waterways and seas. Stormwater is a major carrier of solid pollutants such as plastics, cans, tree branches and animal feces, amongst other things to waterways and seas.

Endeavors have been made to limit the passage of at least some of these materials. One method used is by having grates across outlets from the drains but these have generally been unsatisfactory because the size of the grate must be such as to enable water to pass even if material is held against the grate by water pressure so it has been necessary that the grate be of substantial opening size. Also, even such grates can be blocked and it is essential to provide a flow path around or over the grate to prevent build up of water upstream in the drain system. A second alternative proposed has been the use of systems, such as cyclones and dynamic separators, to remove the waste. Whilst these can be efficient, they are too expensive to be used in the whole of a stormwater system.

2. Separation of liquid from sewage.

A major difficulty with many sewage plants is the sheer volume of liquid to be handled. This is aggravated where a "mixed" system, that is a system which carries both sewage and storm water is used. In many cases, sewage plants could handle more sewage if the quantity of liquid delivered therewith could be reduced, if, for example, liquid was removed from sewage before it enters trunk sewers. To date, this has not been considered feasible.

Also, there are regions where stormwater and sewage are received by the same system. This can cause difficulties where there are heavy rains which overload the system, as it is undesirable to permit raw sewage to pass to overflow.

3. Removal of pollutants from industrial wastes.

Many industrial plants must pay prohibitive rates to discharge polluted liquids into sewers. It would be most desirable to separate a part of the pollution before the waste is delivered to sewers and this would provide economies both to the plant and to the authority if this cost of the early removal of polluted matter was less than the cost, of cleaning up pollution later.

BRIEF SUMMARY OF THE INVENTION

Embodiments of the invention include an apparatus for separating solid matter from a liquid stream, where the apparatus includes a generally cylindrical separation panel surrounding an interior space, which is oriented so as to have a substantially vertical longitudinal axis. The separation panel has a plurality of vertically and horizontally spaced openings which are adapted to remove solid material larger than a predetermined size from liquid passing through the separation panel. The apparatus also includes a chamber surrounding the separation panel and providing a chamber portion into which the liquid passes after passing through the separation panel. The apparatus may further include an inlet positioned below the separation panel, through which the liquid stream is delivered from a bottom opening of the separation panel to said interior space and which is arranged such that the liquid circulates about said axis so as to pass said separation panel, and an outlet extending from said chamber portion, the outlet being positioned with respect to the chamber portion so that at least a portion of said panel is submerged. The panel has a plurality of vertically and horizontally spaced deflective segments adjacent the openings and which project inwardly with respect to said space to inhibit particulate matter of at least said predetermined size from blocking said openings by the openings being positioned behind the deflective segments relative to the flow of the liquid there passed.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

FIGS. 16A and 16B show a cylinder driven mechanically in a direction opposed to the protruding deflective segments of the separation apparatus causing deflection of particulant matter away form the device while allowing liquid to pass through via the openings.

FIGS. 17A and 17B show a mechanically driven apparatus with internal deflective segments and openings.

DETAILED DESCRIPTION OF THE INVENTION

Figure 1:
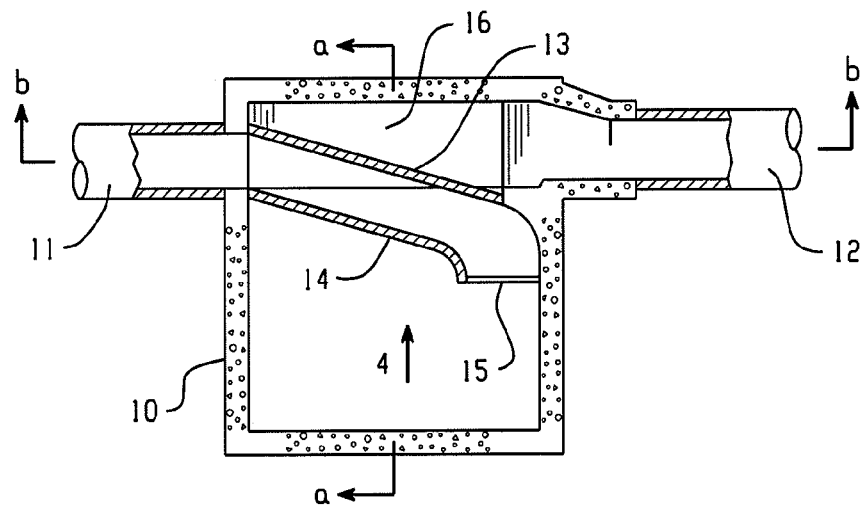
FIG. 1 is a plan view through-one example of a separator made in accordance with the invention.
Figure 2:
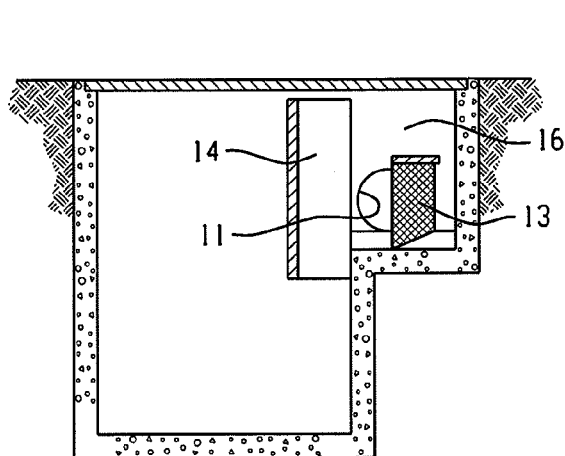
FIG. 2 is a vertical section along line a-a of FIG. 1.
Figure 4:
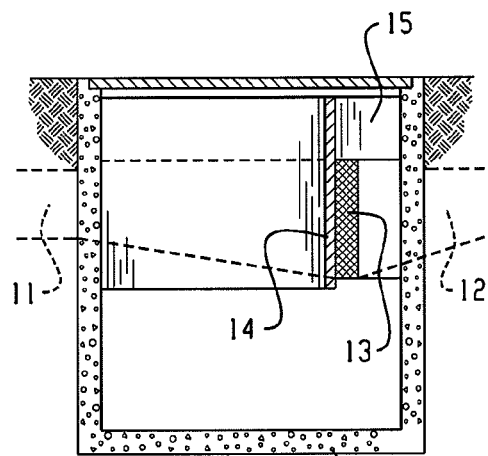
FIG. 4 is a view along arrow 11411 of FIG. 1.
Figure 3:
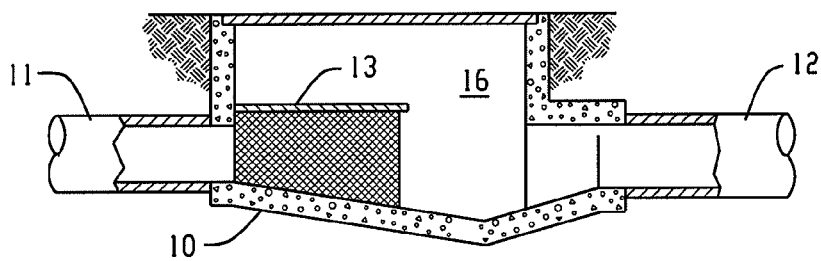
FIG. 3 is a vertical section along line b-b of FIG. 1.

Aspects of the invention relate to nonmechanical methods of and apparatuses for separating floating and suspended solids from flowing liquids.

The apparatuses may include a means for the separation of solid matter from a liquid including a perforated separation panel into which the liquid may enter from below, and which prevents the passage of the solid matter of a size larger than a predetermined size characterized in that when solid matter becomes located against the panel, the flow of liquid along the face of the panel on which the solid matter is located will tend to cause it to move from the panel so that the panel is self cleaned and does not become obstructed by the solid matter.

The methods may include non-mechanical methods for separating solids from a flowing liquid by utilizing the energy of the flowing liquid from the bottom inlet, a separation panel in the path of the fluid flow and so arranged that the liquid is deflected thereby, which deflection causing larger suspended solids to a collection sump or the like. At the same time, the liquid flow across the separation panel prevents the panel from clogging. Liquid containing some finer suspended solids can pass through the panel to the outlet side. Floating solids are retained in the collection sump behind a flow direction baffle and can be prevented from inadvertent delivery during high flow conditions by a high level baffle located adjacent the top of the separation panel.

The apparatuses for the separation of solids from a flowing liquid may also include an inlet and an outlet for the liquid, a separation panel in the path of flow between the inlet and the outlet, the panel presenting a closed face in the direction of flow but apertures therethrough at an angle thereto, liquid being able to pass through the apertures whereas solids are caused to pass over the face thereof.

The arrangement is such that even solids smaller than the size of the apertures can be caused to move past the apertures either because of the inertia of the solids, or the action of gravity, or both.

In this specification, where we refer to water flow, this is intended to include relative water flow and thus there can be circumstances where the separation plate is moving as well as, or instead of, the water.

The present invention may also include an apparatus for separating solid or particulate matter from a flowing liquid or gas, where the apparatus may include a separation panel positioned in the path of flow of the liquid or gas, the separation panel including a plurality of openings, wherein the openings are of a predetermined size such that only solid or particulate matter smaller than that size is able to pass through the openings, and wherein further, the configuration and arrangement of the openings on the separation panel is such that in use of the apparatus, solid or particulate matter larger than the predetermined size is substantially prevented from adhering to or obstructing the separation panel.

The arrangement of the openings in the separation panel may be such that, in use of the apparatus, the openings are disposed at an angle relative to the direction of flow of the liquid or gas. In addition, the configuration of the openings may be such that each opening includes a deflection means generally opposed to the direction of flow of the liquid or gas, to assist in deflecting solid or particulate matter entrained in the flow, away from the openings.

The separation panel may have a curved structure. For example, the apparatus may include a generally cylindrical separation panel with an open ended generally cylindrical structure. The separation panel may also form part of a larger separation chamber, into which, in use of the apparatus, the liquid or gas flow is introduced by an inlet means positioned below the separation panel, so as to establish a circular flow of the liquid or gas within the separation panel. This circular flow causes solids or particulate matter of a predetermined size entrained in the liquid or gas to be trapped and to circulate within the confines of the separation panel. The circular motion of the flowing liquid or gas within the separation panel also results in the entrained solids or particulate matter generally not adhering to the separation panel, but being entrained in the circular motion of the liquid or gas. In this way, the establishment of a circular flow motion of the gas or liquid within the separation panel is such as to enable the separation panel to act as a generally self-cleaning filter for the solid or particulate matter entrained within the flowing liquid or gas. The fact that the liquid or gas is able to pass freely through the openings in the separation panel means that the panel is able to filter solid or particulate matter of a predetermined size from the flowing liquid or gas, thereby enabling the liquid or gas to be discharged to an outlet means, at least substantially filtered of the solid or particulate matter.

Embodiments of the apparatus may be configured such that in use, the flow of the liquid or gas outside the confines of the separation panel is in a direction opposite to the direction of flow of the liquid or gas within the confines of the separation panel. Such a configuration may assist in maintaining the self-cleaning function of the separation panel.

The apparatus may also include means for facilitating the collection of the solid or particulate matter into a receptacle, from which it may be removed. In some embodiments of the invention, gravitational forces may combine with the circular motion of the gas or liquid within the cylindrical separation panel, so as generally to encourage the deposition of the solid or particulate matter into a receptacle which may be positioned generally below and/or above the separation panel, depending upon the specific gravity of the solid or particulate matter. In the case of solids or particulate matter having a lower specific gravity than the liquid or gas, they will tend to float on the surface of the liquid or gas, in which case, they can be collected by a receptacle generally disposed above the separation panel. In the case of solids or particulate matter having a higher specific gravity than the liquid or gas, they will tend to settle under the action of gravitational forces, in which case, a receptacle to capture them will generally be positioned below the inlet and separation panel.

The apparatus may also include mechanical means to assist the deposition of the solid or particulate matter in the receptacle, through the action of gravity. Such means could take any number of forms, and may include, for example, providing the receptacle with a baffle or flange directed downwardly to encourage the deposition of settleable solid or particulate matter.

Embodiments of the invention also provide methods for separating solid or particulate matter from a flowing liquid or gas. The method may include the steps of positioning a separation apparatus in the path of flow of the liquid or gas, and providing the separation apparatus with a separation panel having a plurality of openings therethrough, wherein the openings may be of a predetermined size such that solid or particulate matter smaller than that size is able to pass through the openings, and wherein further, the configuration and arrangement of the openings on the separation panel may be such that in use of the apparatus, solid or particulate matter larger than the predetermined size is substantially prevented from adhering to, or obstructing, the separation panel.

Embodiments of the method may include an arrangement of openings such that, in use of the apparatus, the openings are disposed at an angle relative to the direction of flow of the liquid or gas. In addition, each of the openings may include a deflection means generally opposed to the direction of flow of the liquid or gas, to assist in deflecting solid or particulate matter entrained in the flow, away from the opening. In these embodiments of the methods, the separation panel may take the form of a curved structure. For example, the separation panel may take the form of a generally cylindrical structure, and the separation apparatus includes inlet and outlet means for directing the flow of the liquid or gas into, and out of, the separation apparatus respectively. The separation panel may have an open ended, generally cylindrical structure.

Embodiments of the methods may also include introducing liquid or gas into the separation apparatus via an inlet positioned below the separation chamber, to present the liquid or gas to the separation chamber, which includes a generally cylindrical separation panel, so that a circular motion of the liquid or gas is established within the confines of the separation panel, so as generally to trap solid or particulate matter of a pre-determined size within the separation panel, yet at the same time, permit the liquid or gas to pass therethrough freely, and so that the separation panel is continually cleaned by the circular motion of the liquid or gas within it.

In embodiments of the methods, the configuration of the apparatus is such that in use, the flow of the liquid or gas outside the confines of the separation panel is in a direction opposite to the direction of flow of the liquid or gas within the confines of the separation panel, so as to assist in maintaining the self-cleaning function of the separation panel, in use of the apparatus.

The method may also include the step of providing means to facilitate the collection of the solid or particulate matter separated by the method, from the flowing liquid or gas. Such means could, for example, utilize the assistance of gravitational forces, to assist in the collection of the solid or particulate matter. The method may also include means for facilitating the removal from the separation apparatus, of solids or particulate matter separated from the flowing liquid or gas.

In order that the invention may be more readily understood, reference will be made to the accompanying drawings, which show additional examples of the invention. Referring to FIGS. 1-4 an apparatus is illustrated which is a gross pollutant trap placed in line in, say, a stormwater drain.

Before describing this in detail, the invention is equally applicable to major applications, such as in open channels, feeders or trunk stormwater drains or can be used in smaller applications such as in car parks. In the first type of application, the apparatus can be cast in situ or could be fabricated from pre-cast components, and in another could be of a pre-cast construction.

The type of apparatus illustrated in FIGS. 1 to 4 can be considered a larger construction and, in this case, the apparatus may be retrofitted into a stormwater system having an area which gives reasonable access.

The apparatus may have a containment sump 10 which may be contiguous with a separation chamber 16 as shown. The sump 10 may be located beside the original position of the stormwater drain, which is broken to provide an inlet 11 into and an outlet 12 from the separation chamber. As the sump has to be cleaned at intervals, the size of the sump is such as to give a required interval between cleaning and to allow recirculation of liquid into the separation chamber. It can vary in form and dimensions to suit specific site and project requirements.

The separation chamber has the separation panel 13 which is preferably a stainless steel plate, as will be described hereinafter, and which acts to separate the inlet 11 from the outlet 12. Parallel to the separation panel there may be a containment and flow direction baffle 14 which can be basically parallel to and spaced from the separation panel. This baffle 14 may be arranged to allow recirculation and may preferably extend from the top of the chamber to contain floatables and to below the bottom of the separation plate to permit recirculation. A high level baffle 15 may be provided to retain floatables during high fluid flow conditions.

As illustrated, the separation panel 13 may be perforated and formed so that it presents to the incoming liquid a closed face. As can be seen from FIG. 6, the panel can be deformed so that there are a number of surfaces 20 which are directed towards the flow and which have therebehind a number of apertures 21, which pass through the panel. A formation such as this is possessed by expanded mesh.

There are other ways in which the separation panel may be formed, including the use of a series of bars or flat rods which are located to provide a closed face to the flow but with apertures located behind and between these. The closed face may present a positive angle to the flow of liquid. The angle may vary with different applications of the invention and may range from being directly across the flow, to being substantially parallel to the flow.

On liquid entering through the inlet, the sump 10 is first filled and then the liquid is then caused to move along the separation panel 13, and is constrained to this movement by the containment and flow direction baffle 14.

As there is effectively an hydraulic head between the inlet 11 and the outlet 12, whilst there will be movement of the liquid and any entrained solid material along the panel 13, there will be movement of liquid through the apertures 21, to the outlet 12. The solid material will, if it strikes the panel, tends to move along the panel by the forward momentum of the liquid and down the panel, by gravity. Should solid material larger than the apertures strike the surface, the forward movement of the liquid provides a self-cleaning of the surface of the panel so there is little or no tendency for blockage. The apparatus can thus be left for substantial periods with confidence that the panel will not become blocked, it only being necessary that the sump is cleaned at intervals before it is over-filled with solid material.

Because of the form of movement, we have found the arrangement such that not only is all solid material larger than the apertures in the panel retained, but much that is smaller.

The solid material is carried through to the sump where it tends to drop under gravity and whilst some material, particularly light material, can be moved past the separation panel more than once. The liquid which enters the sump tends to move in an arcuate manner and most of the material falls into the sump after its first movement therethrough and before it is again passed along the face of the separation panel.

Floatables may also be held in the sump. However if upstream control of floatables, say by the provision of similar apparatus at major sources such as take away food outlet car parks, is good, there may not be great quantities of floatables to be retained.

In order to maintain the apparatus, it is only necessary to empty the sump 10 at intervals to prevent excessive build up of solid matter in the sump.

Under extreme conditions, say flood or near flood conditions, it will be seen that the apparatus of the invention will not act as a source of difficulties. The apparatus can be so designed as to carry as much liquid as the inlet stormwater drain.

If, say because of poor maintenance and the build up of solid in the sump, an overflow can be provided over the top of the separation plate. For these conditions, we provide the high level baffle 15 which extends from just below the top of the separation plate to the top of the flow diverter baffle and acts to retain floatables.

Figure 5:
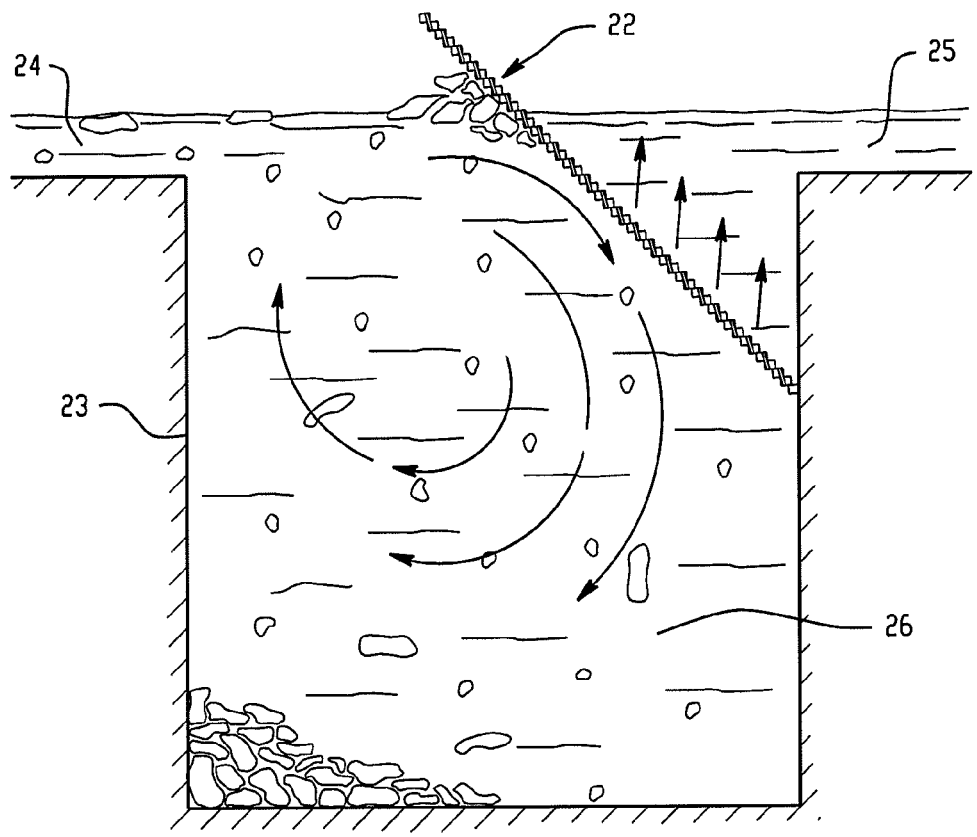
FIG. 5 shows a vertical section through a second example of a separator according to this invention.
Figure 6:
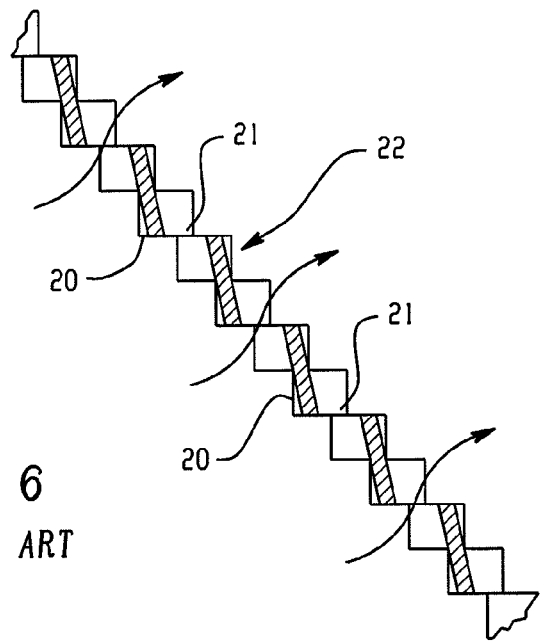
FIG. 6 shows an enlarged detail of the vertical section through the separation panel.
Figure 7:
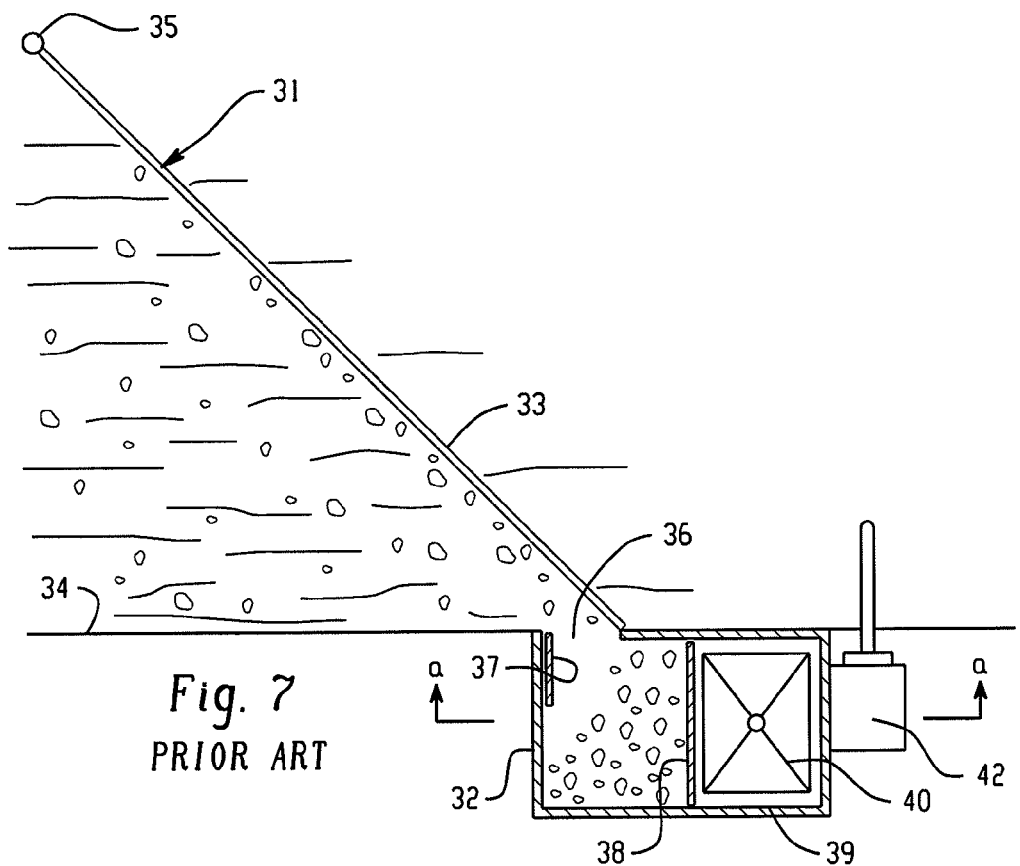
FIG. 7 shows an example of an installation in a channel or river of separation panels for the removal of solids from a flowing liquid and subsequent collection and storage.
Figure 8:
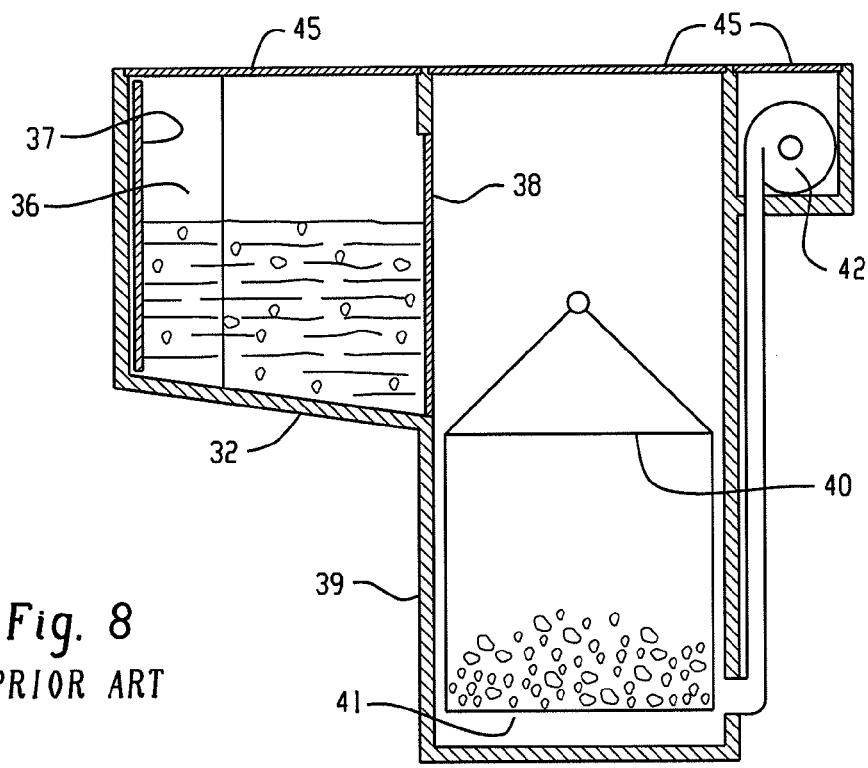
FIG. 8 shows an enlarged section a-a through the holding chambers.

Referring now to FIGS. 5 and 6, we illustrate a simple construction which utilizes the invention and can be used in open channels or the like.

The liquid containing suspended and floating solids enters through inlet 24 into the separation chamber 23. The chamber is divided into inlet and outlet sides by a separation panel 22 fixed at the lower edge to the outlet side of the chamber 23, and inclined at an angle towards the inlet 24. Again the panel 22 presents a closed surface to the incoming liquid but, as described in relation to the previous embodiment, liquid can pass through the panel 22 and to the outlet 25.

The panel 22, the sides of the inlet 24 and the inlet sides of the chamber 23 extend to a height above surface sufficient to prevent any floating solids from crossing over to the outlet side of the chamber 23.

The panel 22 can be skewed to one side to aid the movement of floatable materials off to the side and away from the panel.

Again, as previously discussed, the separation panel 22 is constructed with a series of segments 20 which are angled when the panel is in its required orientation and thus provide a substantially solid face opposing the liquid flow and a corresponding series of substantially horizontal openings 21 that allow the liquid to pass up and through the panel 22 to the outlet side of the chamber 23 and thence to the outlet 25.

The substantially horizontal orientation of the openings 21 in the panel 22, combined with the general downward liquid flow over the inlet side of the panel, discourages clogging and blocking of the openings by the suspended solids. A large portion of the kinetic energy of the suspended solids is dissipated as they are deflected and forced down at the panel causing them to settle down to the collection sump 26 at the bottom of the chamber 23. These solids can also be caused to move to the side as well as down.

The collected solids are removed periodically by manual or mechanical means.

Referring now to the embodiment of FIGS. 7 to 11. This embodiment shows use of the invention as a boom or the like extending across a waterway or channel. The separation panel 31, which can be in one piece or made up of overlapping segments, is placed in the flowing liquid at an angle so as to deflect suspended and floating solids to the side collection chamber 32. The panel 31 preferably extends far enough below surface level to catch floating and near-surface suspended solids. It can, in the case of a channel or river installation as shown in FIG. 6, be supported by a tensioned cable 33 anchored to the bank 34 at one end and to a substantial pylon 35 set in the channel, at the other end. It may be continuous across the width of the river or as shown in FIG. 6 only project part way across, being placed at a strategic location near a bend to maximize the amount of solids caught.

The collection chamber 32 has an opening 36 to the channel which although normally being open, is periodically closed by a mechanically operated door 37 to prevent further ingress of liquid and solids. When this door 37 is closed, the mechanically operated door 38 to the stockpiling chamber 39 is opened, allowing all the liquid and solids from the collection chamber 32 to enter. When the collection chamber 32 is empty, the door 38 to the stockpiling chamber 39 is closed and the door 37 to the channel is opened again allowing ingress of liquid and solids to the collection chamber 32.

The stockpiling chamber 39 contains a removable basket 40 open at the top made of similar material to the separation panel, thus allowing the liquid to pass through the basket to the lower part 41 of the stockpiling chamber from whence it is removed and discharged to the channel by mechanical means such as a pump 42. Solids are retained in the basket 40 which can be removed and emptied periodically. Both chambers are covered by removable lids 45.

Figure 9:
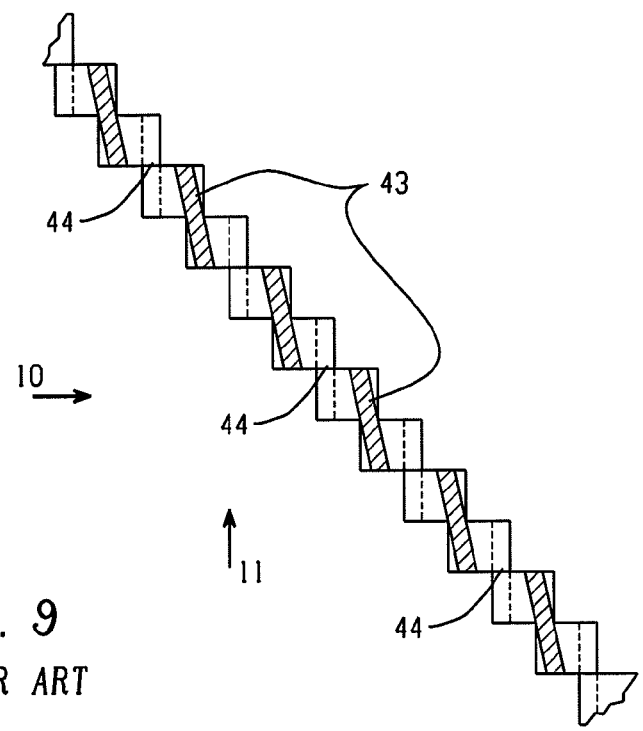
FIG. 9 shows as enlarged horizontal section through the separation panel.
Figure 10:
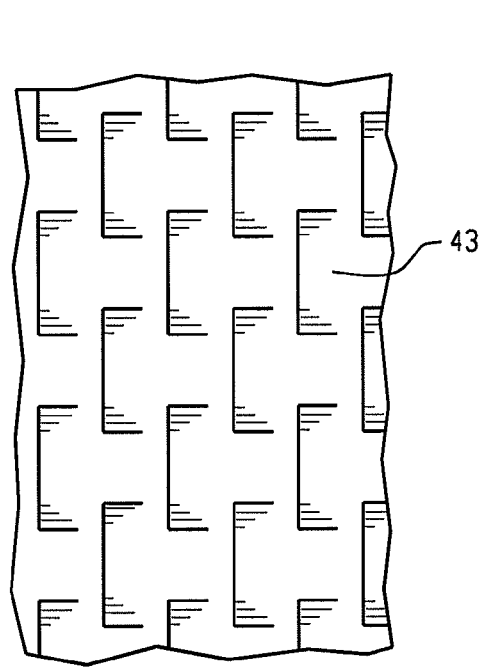
FIG. 10 shows an enlarged elevation of the separation panel viewed in the direction of flow of the channel in FIG. 9 at view "10" with the openings substantially closed to view.
Figure 11:
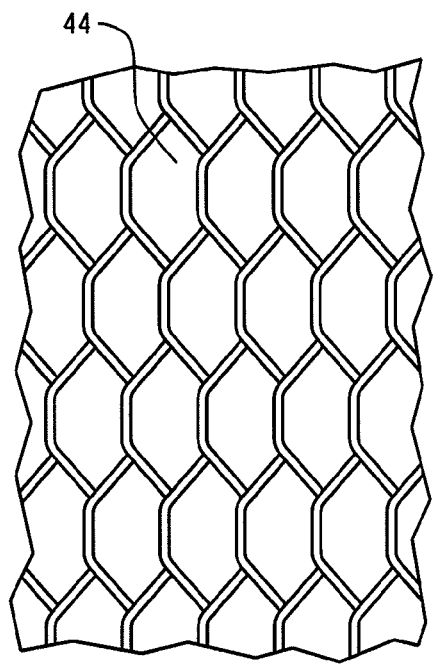
FIG. 11 shows an enlarged elevation of the separation panel from the angle giving maximum open space, in FIG. 9 at view "11."
Figure 12:
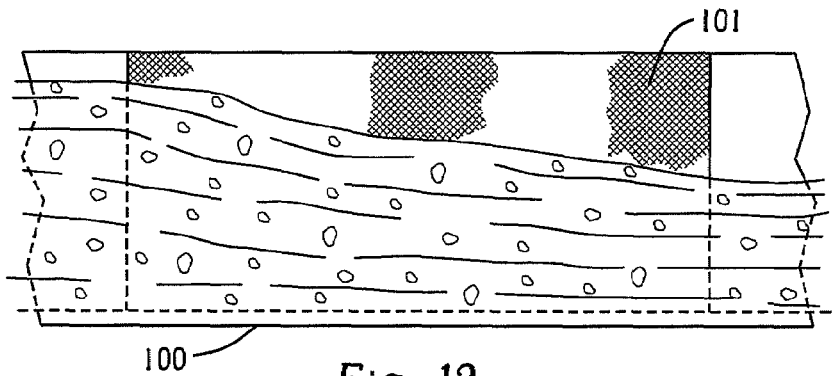
FIG. 12 shows a side elevation view of a system which can remove water from sewage whilst permitting the solid matter to proceed, and is a view along line 12-12 of FIG. 13.

The separation panel 31 in this example is an expanded metal stainless steel plate placed in a substantially vertical plane and angled to the direction of flow so that the solid segments 43, FIG. 9, form a substantially closed face when viewed from the direction of flow causing solids to be deflected along the direction of the panel 31. The liquid passes freely through the openings 44, FIG. 11, in the panel and continues, unimpeded by the panel 31, in the flow.

FIGS. 12 to 15 show a system whereby liquid can be removed from sewage so that the sewage, together with enough liquid to act as an effective carrier thereof can be passed to a main sewer, possibly through a pumping station, and the liquid can be passed to a treatment plant whereby it can be treated either to a stage in which it can be used, for example, for watering or even to a stage in which it become potable.

It will be appreciated that the capacity of sewers and treatment plants are limited by the amount of liquid passing therethrough or thereinto. If the amount of liquid can be restricted, this will enable effectively greater capacities than would otherwise be the case.

Sewage is often passed through pumping stations and if there is to be separation of the liquid from the solid material, it is necessary that such separation occurs before any pumping which tends to homogenize the material.

The system of FIGS. 12 to 15 includes a channel 100 which carries the liquid/solid mixture and on one side of this there is a separation panel 101 which can have the same properties of the panels described earlier herein.

On the side of the panel 101 away from the channel 100 there is a liquid receiving area 102 which has an outer wall 103.

The outer wall 103 defines the volume of material which can pass through the screen and the tapering shape aids in the maintenance of similar surface gradients on each side of the plate 101.

Figure 13:
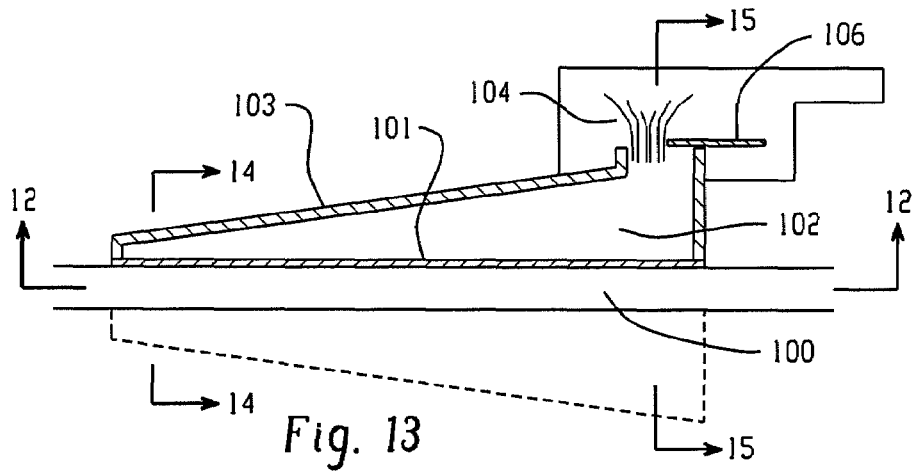
FIG. 13 shows a plan view of the system of FIG. 12.
Figure 14:
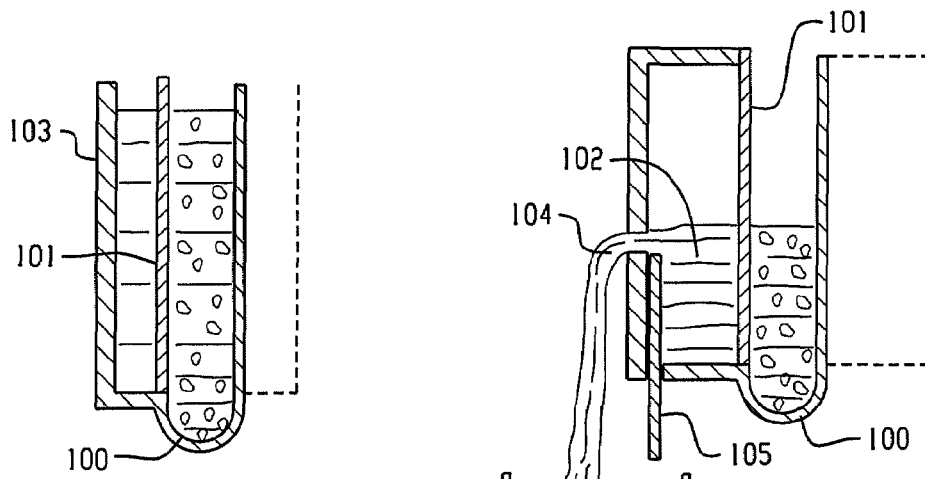
FIG. 14 is a view along line 14-14 of FIG. 13.
Figure 15:
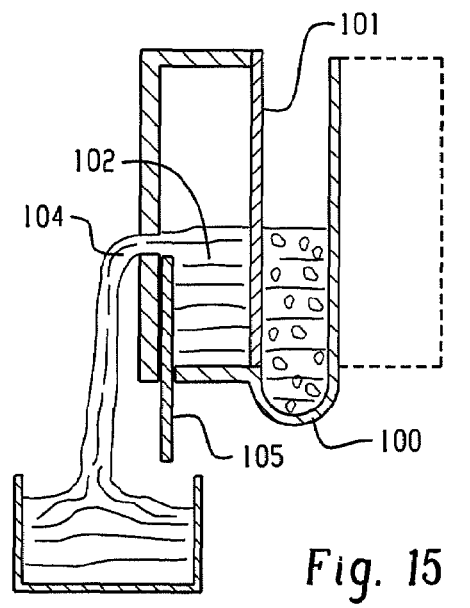
FIG. 15 is a view along line 15-15 of FIG. 13.
Figure 18:
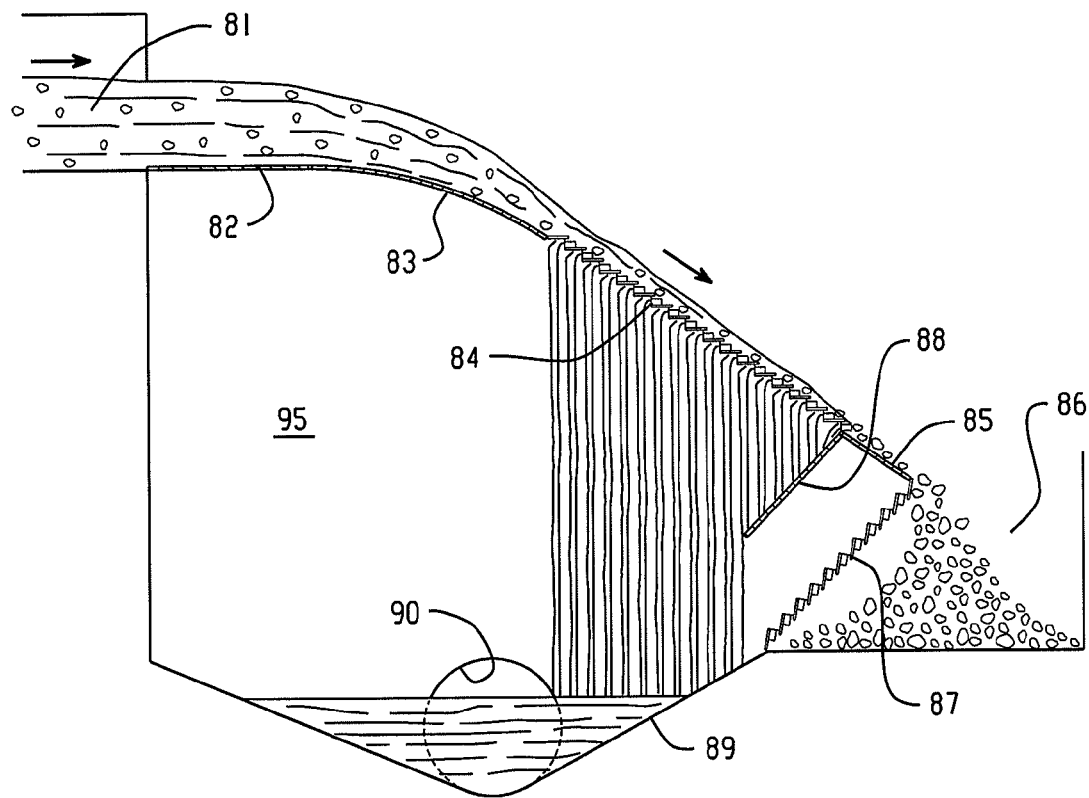
FIG. 18 shows a longitudinal- vertical section through a further embodiment of the invention.
Figure 19:
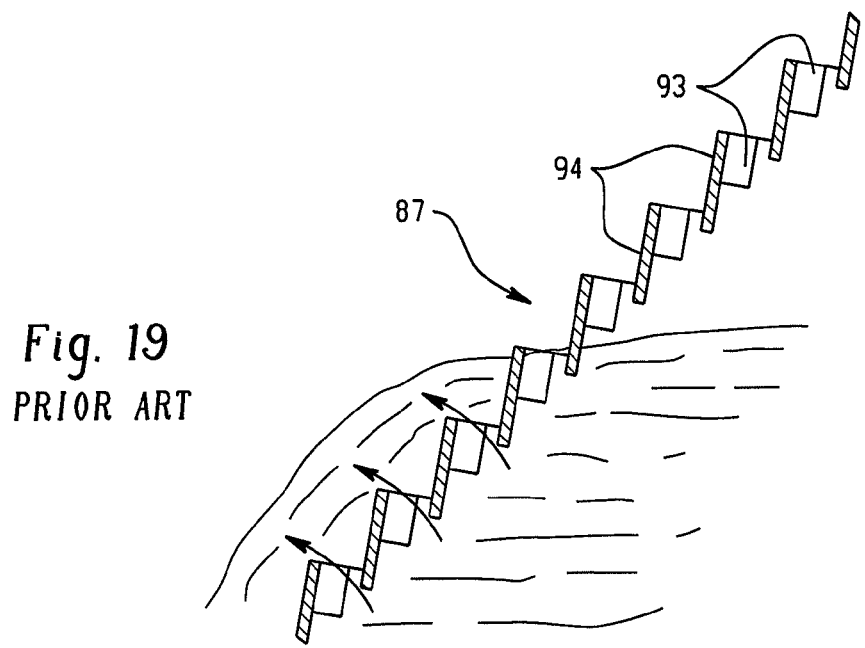
FIG. 19 shows an enlarged detail of the section through the lower separation panel of FIG. 18.

If the volume of flow is sufficient, it may be desirable to have separation panels on each side of the channel and the location of the other separation panel and its receiving area and wall are illustrated in broken line in FIG. 13.

The outer wall has an outlet 104 which may be closed by gates 105 and 106. The gate 105 effectively controls the head in the channel 100 as liquid will pass through the plate 101 and reach the level of the top of the gate 105 before any liquid is passed to the outlet 104. The gate 106 aids in the control of the size of the outlet and thus the characteristics of the flow. Specifically, this can control the effective head and thus ensures that the flow though the channel is such as to ensure that the screen 101 is self cleaning.

Referring now to FIG. 16, the apparatus 61 is placed in liquid 64 containing particulate matter and rotated as shown at 63 in a direction so as to produce relative movement and deflection by the protruding segments 68 while allowing liquid to pass through the surface 62 of the apparatus by way of the openings 67. Liquid is removed from inside the cylinder 66. The apparatus is rotated about its centre 65.

It may be preferred that the liquid 64 is also be caused to move relative to the apparatus to obtain the best operation.

Referring to FIG. 17, the apparatus 69 has a conical shape and rotated at its axis 70 at an angle downward showing the openings 73 to be closed to a perpendicular view from the inside of the apparatus 69. Liquid containing particulate matter 74 enters at the smaller opening 77 and passes over the inside surface of the apparatus 78. The protruding deflective segments 72 as shown in detail 71 cause particulate matter to pass down along the inside surface of the apparatus and exit at the larger opening 76 while liquid is able to pass around the deflective segments 72 through the openings 73 and downward away from the apparatus 75. This process is aided by its rotation 79.

Referring to FIGS. 18 to 21, we provide an apparatus which, whilst using the principle of the invention, highlights the effect of gravity on liquid movement through the separation panel.

In this embodiment, the liquid/solid mixture enters through the inlet 81 into the upper part of the inlet side of the separation chamber 95, passing over a substantially horizontal spreader plate 82 to allow the flow from the restricted inlet 81 to spread out towards the sides of the chamber. It then passes over the direction plate 83 which is curved to further spread the flow to the width of the chamber and direct the flow towards the upper separation panel 84. The spreader plate 82 and the upper separation panel 84 are substantially tangential to the curved flow plate 83 at its top and bottom edges respectively.

In this example of the invention the separation panel 84 is made from expanded metal sheets. The openings 91 in the panel are individually in a substantially vertical plane while the connecting solid segments 92 have a positive downward slope in the direction of flow. They form a series of small downward sloping steps over which the larger solids are directed, by the action of gravity and force of the flowing liquid, to the solids collection sump 86 at the base of the panel 84. There may be a solids straight or curved transition panel 85 at the base of the separation panel 84 to aid in clearing the panel of certain types of solids.

The layer of liquid closest to the separation panel 84 is subject to pressure by the action of gravity and the pressure of the overlying blanket of liquid and at each step in the panel 84 a portion of the liquid passes through the openings 91 to drop to the outlet collection sumps 89 below and thence to the outlet 90.

The solids collection sump 86 has on at least one side a backward sloping separation panel 87 fixed to the outlet side of the sump 86. This lower separation panel 87, is formed with a series of vertical or backward sloping solid segments 94 that provide a substantially solid face to solids in the sump 86, and a corresponding series of substantially horizontal openings 93 that allow the liquid and finer suspended solids to pass through the panel 87 under the action of water pressure, and thence to the outlet sump 89 and the outlet 90.

A solid deflection panel 88 may be located below the lower portion of the upper separation panel 84, sloping down from the top edge of the transition panel 85 to cover the lower separation panel 87. Liquid and finer suspended solids dropping down from the upper separation panel 84 are directed to the outlet collection sump 89 and thence to the outlet 90.

Figure 20:
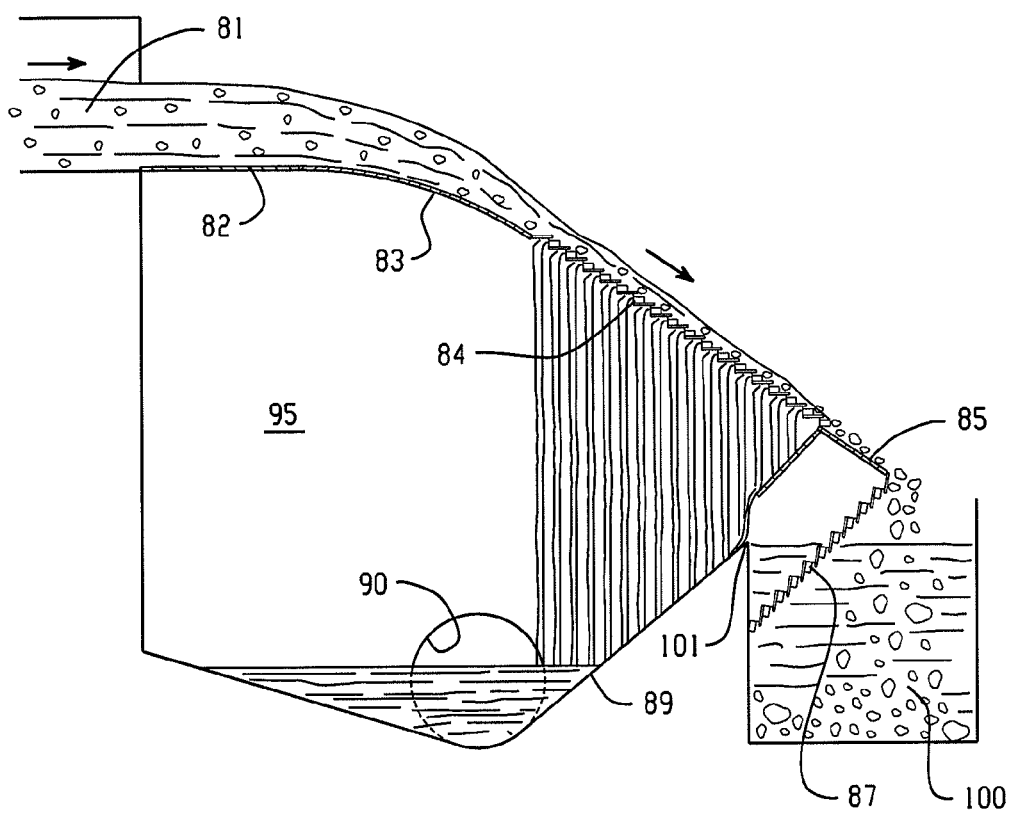
FIG. 20 shows a longitudinal vertical section through another example of this invention which has a water filled solids collection sump.
Figure 21:
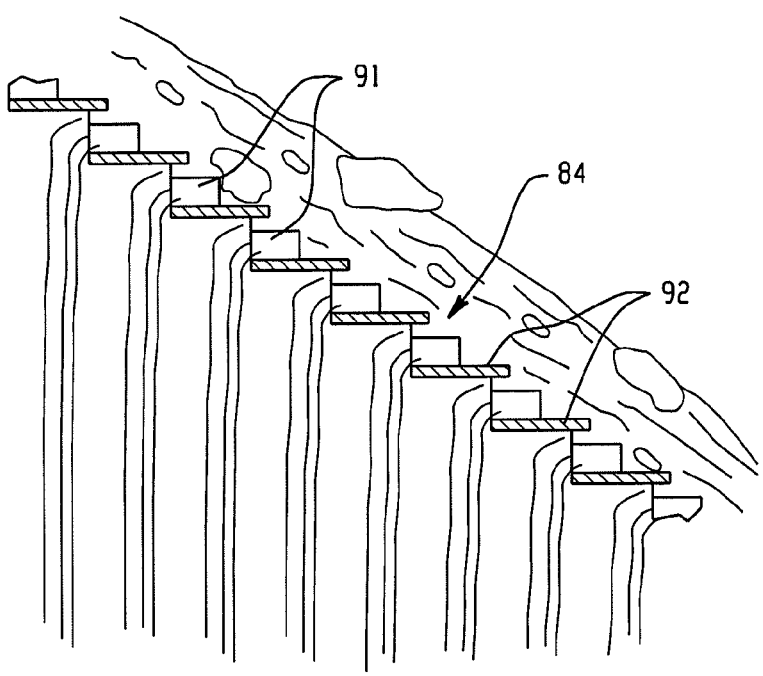
FIG. 21 shows an enlarged detail of the section through the upper separation panel of FIG. 20.

In another, similar, example of the invention, shown in FIG. 20, the solids collection sump 100 is divided into inlet and outlet sides by the lower separation panel 87 fixed at its lower edge to the outlet side of the sump 100 and inclined back at an angle towards to lower edge of the transition panel 85. The portion of liquid that reaches the sump 100 is forced by water pressure through the lower separation panel (formed with openings and solid segments as in the previous example), into the outlet side of the sump 100, over the lip 101 of the sump 100, into the outlet collection sump 89 and thence to the outlet 90. In all other ways this embodiment of the invention is the same as described in the previous embodiment.

Figure 22:
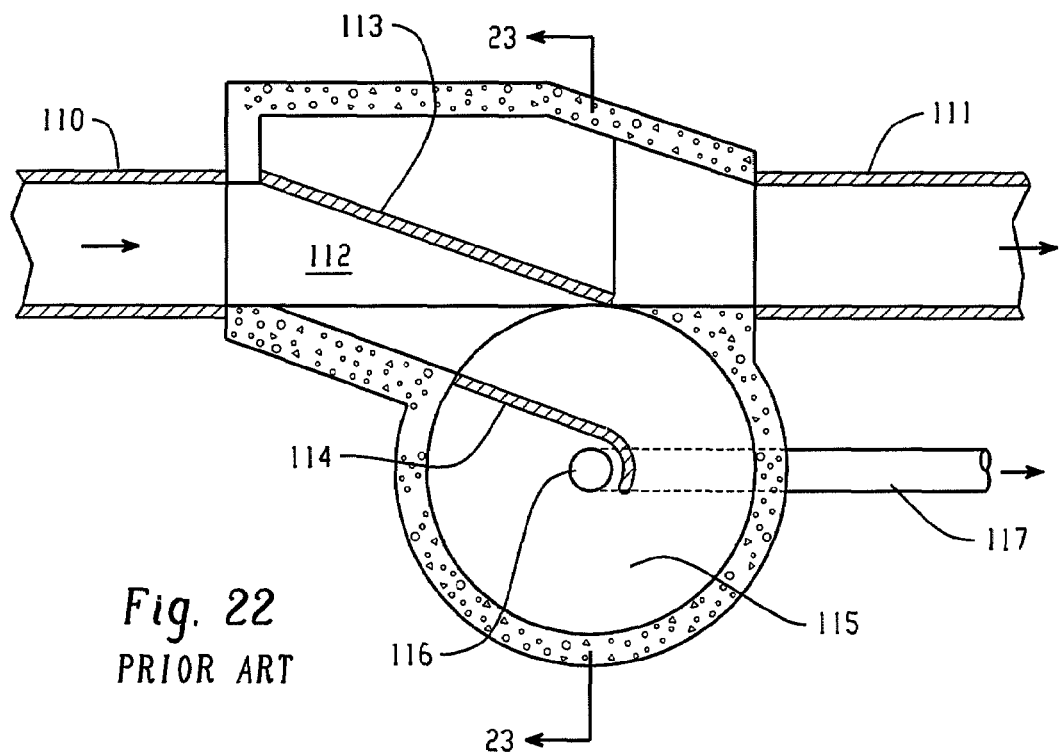
FIG. 22 shows a plan view of an arrangement using a separation plate of the invention, together with a dynamic separator whereby the volume of water relative to solid material can be restricted.
Figure 23:
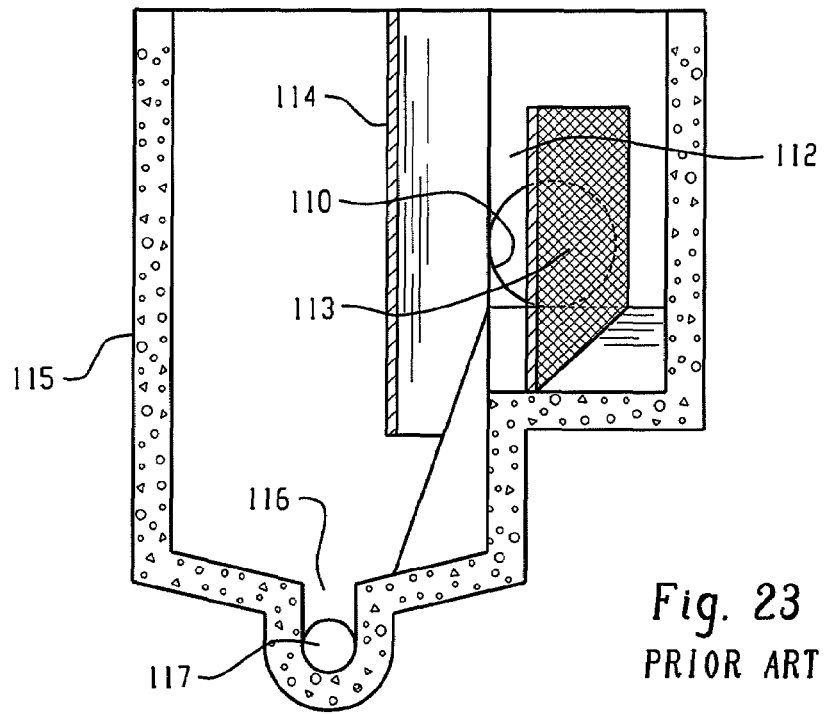
FIG. 23 shows a section along line 23-23 of FIG. 22.

The embodiment of FIGS. 22 and 23 show the use of the concept of the invention together with a dynamic separator. This embodiment can be particularly useful for a mixed system of sewage and stormwater. As previously mentioned, such systems normally carry the sewage load and this can be multiplied many times when there is, say a heavy storm. Sewage treatment plants may well not have the capacity to cope with the increased flow and there can be a loss of raw sewage and any stormwater carried debris.

In the embodiment, under normal conditions, the inlet 110 will carry sewage and any stormwater which will enter the chamber 112 and thence to the dynamic separator 115. In this the sewage and water will pass through aperture 116 to outlet 117.

Under conditions where there is greater flow, where there is substantial stormwater, then the liquid and entrained solids which come through the inlet 110 move along the separation plate 113 which acts as described in the previous embodiments, water will pass through the plate 113 whilst the entrained solids will be moved along the surface of the plate to the dynamic separator 115. Thus there is a restriction on the quantity of water which enters the dynamic separator. With this increased flow, too, there will be a build up of the solids adjacent the centre of the dynamic separator and these, together with the entrained water, will move to the centre, by vortex action, and will pass through the outlet 116. The remainder of the water will tend to be displaced by further incoming water, it will move about the baffle 114 and will tend to re-enter chamber 112.

The capacities of the chamber 112 and the dynamic separator 115 can be selected to enable the maximum outlet of the separator to be the maximum acceptable at the sewage treatment plant and the maximum throughput such as to enable the apparatus to cope with anticipated maximum flows.

Figure 24:
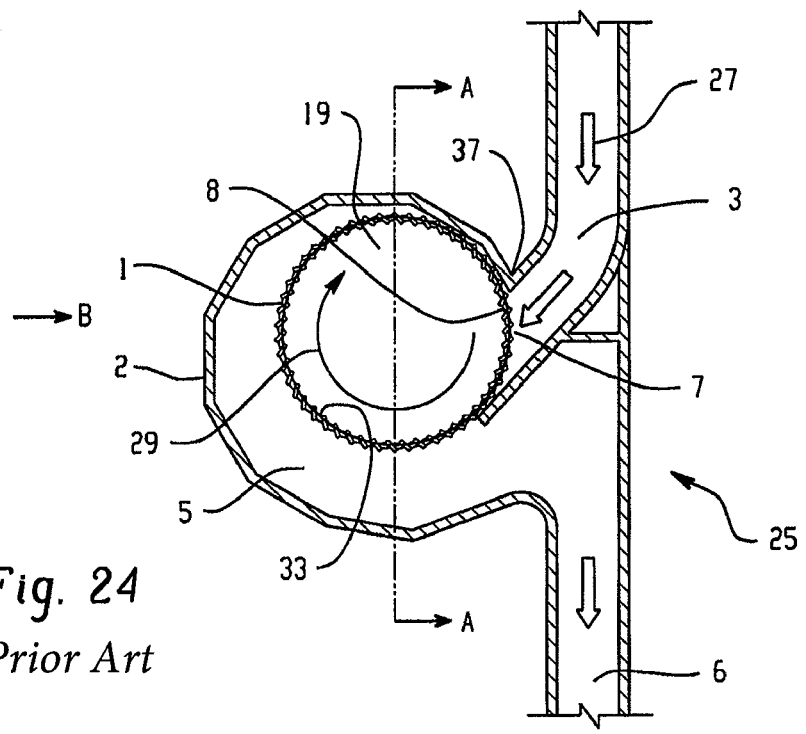
FIG. 24 is a plan view of a further example of a separator made in accordance with the invention.

FIG. 24 shows a plan view of an apparatus which could be used to separate solids from a flowing liquid, such as water (and particularly, storm water). The apparatus, shown, generally denoted 25, includes a separation panel 1, which as depicted, is of a generally circular shape, when viewed in horizontal cross-section. The separation panel 1 shown has an open-ended cylindrical configuration.

Figure 25:
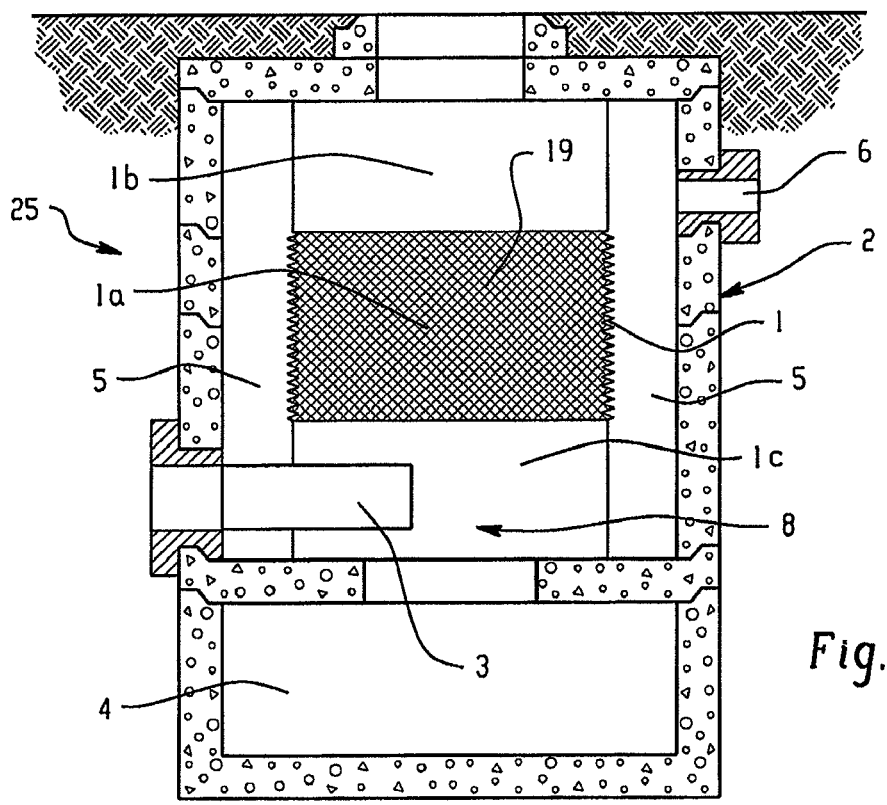
FIG. 25 represents a view (in the direction of the arrow marked "B" in FIG. 24") of a vertical section of the separator shown in FIG. 24, taken along the line A-A in that Figure.

As shown in FIGS. 24 and 25, the separation panel 1 may be located within a separation chamber 2. The separation panel may include a perforated section 1a located between an annular upper section 1b and an annular lower section 1c. The liquid enters the separation apparatus 25 via an inlet means 3, in the direction of the arrow 27 shown in FIG. 24. As shown in FIG. 24, the inlet channel 3 curves to the left until reaching the body 37 of the separator 25, where water and entrained solids or particulate matter well up from the bottom end 8 of the separation panel 1 into the panel interior 19, as shown in FIG. 25. In the embodiment illustrated in FIG. 25, the inlet means 3 and the outlet means 6 are shown on opposite sides of the separation chamber 2. Additional embodiments may have the inlet means 3 and outlet means 6 positioned on the same side of the chamber 2, or at some other position with respect to each other (not shown). The generally cylindrical configuration of the separation panel 1 is such that when the water comes to the separation panel 1 from inlet 3 coupled to annular lower section 1c and rises up from bottom end 8 and enters the interior (or confines) 19 of the separation panel 1, a circular flow motion is established within the confines 19 of the separation panel 1, in the direction shown by the arrow 29 shown in FIG. 24.

Figure 26:
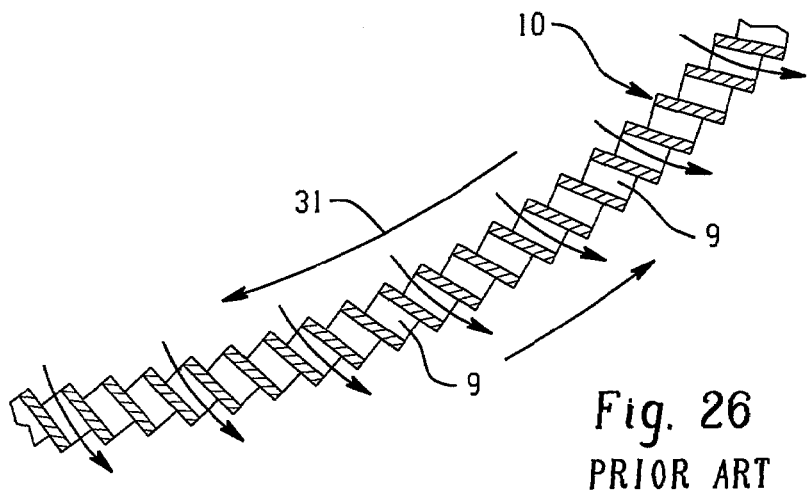
FIG. 26 shows an enlarged horizontal section of part of a separator panel for use in the invention.

Referring now to FIG. 26, it will be seen that the exemplary separation panel 1 depicted consists of a number of deflection means in the form of solid deflective segments 10 which generally present a closed face to the direction of flow of the liquid (as shown by the arrow numbered 31 in FIG. 26) within the separation panel 1. Behind each deflective segment 10 in the separation panel, there is an opening 9. As illustrated, each opening 9 is disposed at an angle to the direction of flow of the liquid in the separation panel 1. Moreover, the openings 9 are all of a predetermined size, which is such as to permit the passage only of particulate matter smaller in size than that of the openings. The liquid is of course, also able to pass freely through the openings. In use of the separation apparatus 25, the effect of this arrangement of features is that only the liquid, and solids or particulate matter of a size smaller than that of the openings 9 are able to pass through the separation panel. Solids or particulate matter of a larger size are therefore trapped within the confines 19 of the separation panel. Moreover, the circular motion of the liquid within the confines 19 of the separation panel means that trapped solids or particles are continuously deflected from the interior wall 33 of the separation panel, as shown in FIG. 24. The net effect of this arrangement is therefore that the separation panel 1 is substantially self-cleaning.

Solids trapped within the confines 19 of the separation panel are therefore caused to continue moving by the circular flow until they settle under gravity, or, if floatable, are retained on the surface. At the same time, untrapped solids and the liquid are able to pass through the separation panel into the outside portion 5 of the separation chamber 2, and thence to the outlet means 6 (which, as shown in FIG. 24, may take the form of a channel, pipe or other-suitable outlet structure).

As shown in FIG. 26, preferably, the flow of the liquid or gas outside the confines of the separation panel is in a direction opposite to the direction of its flow within the confines of the separation panel. This counter-current flow motion on opposite sides of the separation panel establishes a kinetic equilibrium which in turn facilitates the generally self-cleaning function of the circular flow motion established within the confines 19 of the separation panel.

Figure 27:
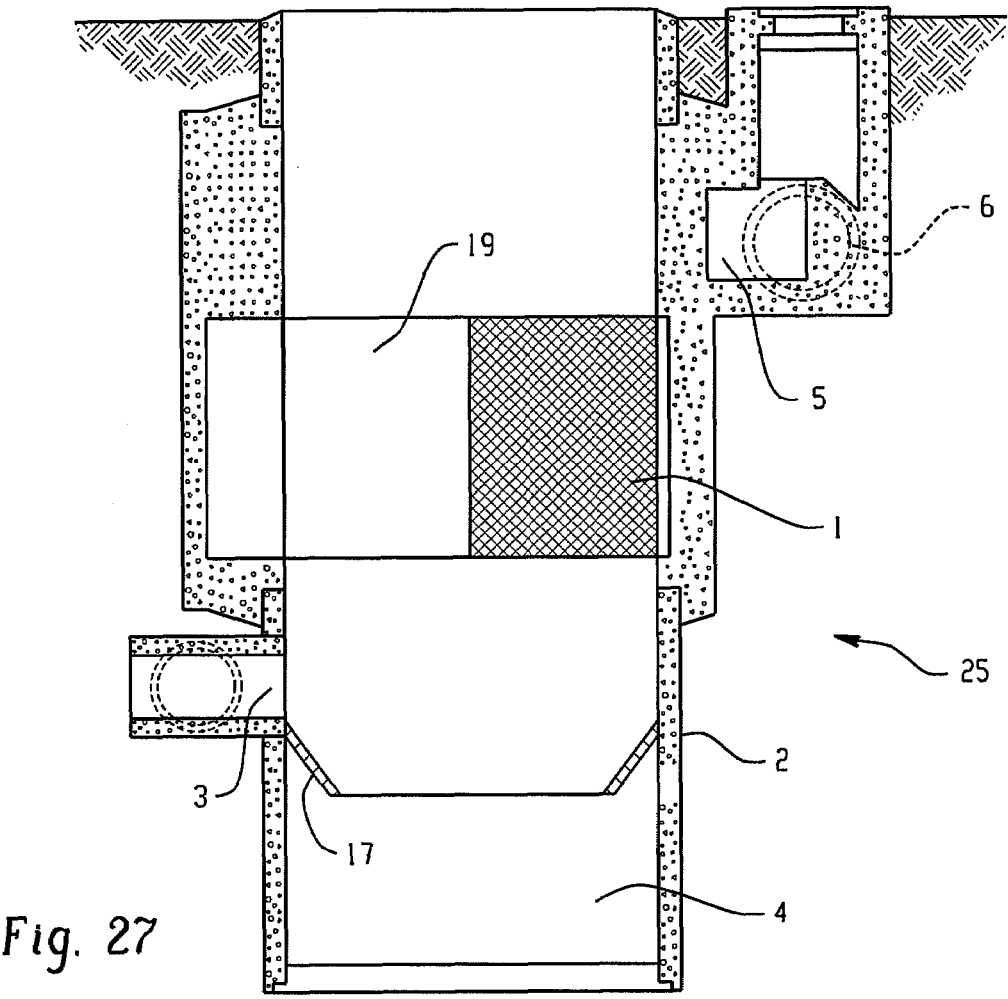
FIG. 27 is a view from the side of a vertical section through an exemplary separator made in accordance with the invention.

As shown in FIGS. 25 and 27, the separation apparatus 25 may also include a receptacle 4, such as a collection sump, for the containment (and removal, if desired) of settleable solids. The sump 4 may be sized or configured so as to slow down the circular flow of the liquid at the lower portion of the apparatus 25, so as to facilitate settlement and storage of solids. The sump 4 may also be provided with any suitable means to facilitate the removal of settled solid or particulate matter. Such means could include, for example, periodic removal by extraction, or a mechanical bucket or basket that is suspended in the sump. Floatables which are left floating on the top of the body of water treated by the separation apparatus 25 could be removed by any convenient means. In the apparatus shown, the outlet means 6 is located adjacent an annular upper section 1b of the separation panel 1.

As shown more particularly in FIG. 27, the separation apparatus may also include means for assisting the settlement of solids into the sump 4. The means, as shown in FIG. 27, may include a downwardly directed annular flange or baffle 17 that helps direct downwardly moving solids into sump 4. The flange or baffle 17 may also reduce the circular flow current in the sump 4 region.

Where particularly "purified" liquids or gases are required at the conclusion of the filiation procedure, it is possible for the outlet from one separation apparatus according to the invention to feed into the inlet for a second such separator, and therefore, for the liquid or gas to be filtered sequentially by two or more such separators, arranged in series. In such an arrangement, the size of the openings in the separation panels for the second and subsequent separators could be sequentially (and increasingly) smaller, so that each subsequent separator removes increasingly finer particles. Hence, by this arrangement, very high, or indeed, any desired level of filtration or purification could be achieved.

While much of the aforegoing description of the preferred embodiments has been concerned with apparatus for separating solids entrained in liquids it is to be understood that the invention is equally applicable to the separation of solids entrained in gases. Generally, for more efficient operation of gas/solid separators constructed in accordance with the invention, it would be necessary for the separator to be constructed as a sealed unit, so as to prevent the undesired escape of gases undergoing filtration. (This is a feature which could also be utilized in some liquid/solid separators constructed in accordance with the present invention). In this way, solid matter entrained in exhaust gases and gaseous emissions from various manufacturing plants, could be filtered in much the same way as solid-bearing liquids are treated, using the apparatus and methods of the present invention.

Those skilled in the art will therefore readily appreciate that the apparatus and methods of the present invention are capable of being put to many different uses, and that they embrace many modifications and variations. It is therefore also to be understood that the spirit and scope of the present invention is in no way limited to the particular details of the preferred embodiments described herein, but extends to, and is to be determined by, reference to each novel feature and combination of features defined by the appended claims.

What is claimed is:

1. An apparatus for separating solid mater from a liquid stream, the apparatus comprising:
   a generally cylindrical separation panel surrounding an interior space which is oriented so as to have a substantially vertical longitudinal axis, the separation panel having a perforated section between annular upper and lower sections of the panel, wherein the perforated section comprises a plurality of vertically and horizontally spaced openings which are adapted to remove solid material larger than a predetermined size from liquid passing through the perforated section of the separation panel, and wherein the annular lower and upper sections of the separation panel do not have the vertically and horizontally spaced openings;
   a chamber surrounding the separation panel and providing a chamber portion into which the liquid passes after passing through the perforated section of the separation panel, the chamber extending the full height of the separation panel and providing an annual space between an outer wall of the chamber and each of the upper section, perforated section, and lower section of the separation panel to allow liquid therein;
   an inlet extending into the interior space through an opening in a wall of the annular lower section of the separation panel, the inlet coupled to the annular lower section of the separation panel through which the liquid stream is delivered to said interior space of the separation panel, wherein the liquid stream circulates about the vertical axis in the interior space and rises from the annular lower section to contact the perforated section of the separation panel;
   an outlet extending from said chamber portion, the outlet being positioned above the perforation section of the separation panel so that at least a portion of said perforated section is submerged; and
   a sump receptacle to receive particular matter removed from the liquid stream by the separation panel, wherein the sump receptacle is positioned below the separation panel and in fluid communication with the interior space of the separation panel,
   wherein said perforated section of the separation panel has a plurality of vertically and horizontally spaced deflective segments adjacent the openings and which project inwardly with respect to said space to inhibit particulate matter of at least said predetermined size from blocking said openings by the openings being positioned behind the deflective segments relative to the flow of the liquid there passed.

2. The apparatus of claim 1 wherein the sump receptacle is in fluid communication with the interior space of the separation panel via an opening in a laterally extending wall that separates the separation panel from the sump receptacle.

* * * * *

UNITED STATES PATENT AND TRADEMARK OFFICE
CERTIFICATE OF CORRECTION

PATENT NO. : 7,465,391 B2
APPLICATION NO. : 11/222612
DATED : December 16, 2008
INVENTOR(S) : James A. Heist et al.

Page 1 of 1

It is certified that error appears in the above-identified patent and that said Letters Patent is hereby corrected as shown below:

<u>Column 13</u>

Line 20, after "an", change "annual" to -- annular --.

Signed and Sealed this

Twenty-fourth Day of March, 2009

JOHN DOLL
*Acting Director of the United States Patent and Trademark Office*